(12) United States Patent
Yoh et al.

(10) Patent No.: US 11,860,107 B2
(45) Date of Patent: Jan. 2, 2024

(54) DEVICE AND METHOD FOR DETECTING CONCENTRATION OF SPECIMEN

(71) Applicant: SEOUL NATIONAL UNIVERSITY R&DB FOUNDATION, Seoul (KR)

(72) Inventors: Jai Ick Yoh, Seoul (KR); Jun Ho Yang, Seoul (KR); Jae Hun Jung, Seoul (KR)

(73) Assignee: SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 99 days.

(21) Appl. No.: 17/431,370

(22) PCT Filed: May 20, 2020

(86) PCT No.: PCT/KR2020/006582
§ 371 (c)(1),
(2) Date: Aug. 16, 2021

(87) PCT Pub. No.: WO2020/262822
PCT Pub. Date: Dec. 30, 2020

(65) Prior Publication Data
US 2022/0136975 A1    May 5, 2022

(30) Foreign Application Priority Data
Jun. 26, 2019  (KR) .......................... 10-2019-0076567

(51) Int. Cl.
*G01N 21/68*    (2006.01)
*G01N 15/02*    (2006.01)
(Continued)

(52) U.S. Cl.
CPC .............. *G01N 21/68* (2013.01); *G01J 3/443* (2013.01); *G01N 15/0227* (2013.01); *G01N 21/73* (2013.01)

(58) Field of Classification Search
CPC .... G01N 21/68; G01N 15/0227; G01N 21/73; G01J 3/443
See application file for complete search history.

(56) References Cited

U.S. PATENT DOCUMENTS 6,034,768 A * 3/2000 Fraser .................... G01N 21/67
                                                            216/60
9,030,659 B2   5/2015 Tysk et al.
(Continued)

FOREIGN PATENT DOCUMENTS

JP      10-318926 A      12/1998
JP    2003315271 A *  11/2003  ............. G01N 21/68
(Continued)

OTHER PUBLICATIONS

"Characteristics of Laser-Induced Spectroscopy (LIBS) at Space Environment for Space Exploration", Journal of the Korean Aerospace Society, 2012 by Choi et al. (Year: 2012).*
(Continued)

*Primary Examiner* — Jamil Ahmed
(74) *Attorney, Agent, or Firm* — Kilpatrick Townsend & Stockton LLP (57) ABSTRACT

A device and a method of detecting a concentration of a sample are provided. The device includes a power supply unit configured to supply power to generate plasma, a plasma generation unit connected to the power supply unit and including a pair of electrodes facing each other, a plurality of signal detection units arranged on the pair of electrodes and configured to sense light emitted from the sample because of the plasma, and a controller configured to control a driving start point of the signal detection unit so that the signal detection unit is driven after a preset period of time after oscillation is terminated between the pair of electrodes.

10 Claims, 7 Drawing Sheets

(51) Int. Cl.
　　　*G01J 3/443*　　　(2006.01)
　　　*G01N 21/73*　　　(2006.01)

(56) References Cited

U.S. PATENT DOCUMENTS

| | | | |
|---|---|---|---|
| 10,001,410 | B2 | 6/2018 | Baudelet |
| 2003/0218745 | A1* | 11/2003 | Benicewicz ......... G01N 21/718 |
| | | | 356/318 |
| 2018/0372646 | A1 | 12/2018 | Wang et al. |

FOREIGN PATENT DOCUMENTS

| | | | |
|---|---|---|---|
| JP | 2003315271 | A | 11/2003 |
| JP | 2006220501 | A | 8/2006 |
| JP | 2015004648 | A | 1/2015 |
| JP | 5842165 | B2 | 1/2016 |
| KR | 10-0394093 | B1 | 8/2003 |

OTHER PUBLICATIONS

Choi, Soo-jin et al., "Characteristics of Laser-Induced Breakdown Spectroscopy (LIBS) at Space Environment for Space Resources Exploration," Journal of the Korean Society for Aeronautical & Space Sciences. Retrieved from <DOI: http://dx.doi.org/10.5139/JKSAS.2012.40.4.346> See abstract, pp. 347-348.
International Search Report and Written Opinion for PCT/KR2020/006582 dated Sep. 1, 2020, all pages.
Notification of Reason for Refusal for KR Appln No. 10-2019-0076567 dated May 15, 2020, all pages.
Grant of Patent for KR Appln No. 10-2019-0076567 dated Sep. 8, 2020, all pages.

\* cited by examiner

DEVICE AND METHOD FOR DETECTING CONCENTRATION OF SPECIMEN

TECHNICAL FIELD

The present disclosure relates to a device and a method, and more particularly, to a device and a method of detecting a concentration of a material included in a sample.

BACKGROUND ART

An air purifier measures particle sizes with a camera thereof and predicts a concentration of fine dust by using an optical sensor. For example, in an environment in which the particle sizes are measured with the camera and nothing exists, a degree, in which the light is covered by particles, is calculated by an optical sensor, and the concentration of fine dust is predicted. However, this is to measure the concentration of the fine dust, and thus, it is difficult to analyze various components in the dust.

To measure a concentration of a component included in the fine dust, a method of analyzing components in the fine dust is required. For example, fine dust samples are collected by an inductively coupled plasma mass spectrometry (ICP-MS), or a mass spectrometer is exposed to fine dust to extract data for more than one hour. Then, a molecular analysis device such as a centrifugal separator is introduced to detect heavy metals, molecular components, humidity, etc. However, it takes quite some time to collect and analyze the fine dust through the above method, which is inefficient.

Despite growing interests in air quality, there is a difficulty in analyzing components in the air specifically. Therefore, there is a need for a technology of accurately and quickly analyzing components in the air, for example, heavy metals.

DESCRIPTION OF EMBODIMENTS

Technical Problem

The present disclosure provides a device and a method for detecting a concentration of a sample, which are used to accurately and quickly measure a concentration of heavy metals included in the sample. However, this is merely an example, and the scope of the present disclosure is not limited thereto.

Solution to Problem

According to an aspect of the present disclosure, there is provided a device of detecting a concentration of a sample, the device including a power supply unit configured to supply power to generate plasma, a plasma generation unit connected to the power supply unit and including a pair of electrodes facing each other, a plurality of signal detection units arranged on the electrodes and configured to sense light emitted from the sample because of the plasma, and a controller configured to control a driving start point of the signal detection unit so that the signal detection unit is driven after a preset period of time after oscillation from the electrodes is terminated.

Advantageous Effects of Disclosure

According to a device and a method of detecting a concentration of a sample, a concentration of a heavy metal included in the sample may be accurately and quickly measured through detection of a plasma emission spectrum. The amount of heavy metals in the air may be measured by detecting the amount of light emitted when the heavy metals are ionized and return to a ground state.

According to a device and a method of detecting a concentration of a sample, because signal detection units have different signal start points in time depending on types of the heavy metals, the amount of light emitted from the heavy metals may be accurately measured. Also, the amount of heavy metals may be accurately measured by filtering the light in respective wavelength bands according to the types of the heavy metals.

Because an electrical spectrum is used without chemical preconditioning, the concentration of the heavy metals may be accurately calculated in real time. The scope of the disclosure is not limited to the effects.

BEST MODE

According to an aspect of the present disclosure, there is provided a device of detecting a concentration of a sample, the device including a power supply unit configured to supply power to generate plasma, a plasma generation unit connected to the power supply unit and including a pair of electrodes facing each other, a plurality of signal detection units arranged on the electrodes and configured to sense light emitted from the sample because of the plasma, and a controller configured to control a driving start point of the signal detection unit so that the signal detection unit is driven after a preset period of time after oscillation from the electrodes is terminated.

The plasma generation unit may have a space between the electrodes and through which the sample passes.

The signal detection unit may include a filter configured to filter light in a preset wavelength band and a photodiode configured to electrically convert a signal from the filter.

The controller may be configured to control the driving start point to enable the plurality of signal detection units are respectively driven in different delay times.

The controller may be configured to integrate signals, which are transmitted from the plurality of signal detection units, into identical periods of time.

The device may further include a reference data unit configured to store reference data including information regarding a concentration of a heavy metal, wherein the controller may be configured to integrate the signals from the plurality of signal detection units into a preset period of time, compare integration values with the reference data, and predict the concentration of the heavy metal in the sample.

The plurality of signal detection units may sense light in different wavelength bands, respectively.

The plasma generation unit may be provided in plural, and the plurality of plasma generation units are connected in parallel and arranged at different locations.

According to another aspect of the present disclosure, there is provided a method of detecting concentration of a sample, the method including generating, by a plasma generation unit, plasma in a space between a pair of electrodes facing each other, the plasma generation unit being connected to a power supply unit, terminating oscillation from the pair of electrodes of the plasma generation unit, driving a signal detection unit after a preset period of time, after the oscillation from the pair of electrodes is terminated, sensing, by the signal detection unit, light emitted from the sample, according to a wavelength band, and calculating, by a controller, the concentration of the heavy metal in the sample, from a signal sensed by the signal detection unit.

In the driving of the signal detection unit, the controller may be configured to control a driving start point of the signal detection unit.

In the sensing of the light by the signal detection unit, a plurality of filters and a plurality of photodiodes may sense light in different wavelength bands, respectively.

In the driving of the signal detection unit, the plurality of filters and the plurality of photodiodes may be driven at different driving start points, respectively.

The method may further include obtaining reference data, which is information regarding the concentration of the heavy metal, before the sample is detected, wherein the calculating of the concentration of the heavy metal may include integrating a signal from the signal detection unit for a preset period of time, comparing an integration value with the reference data, and predicting the concentration of the heavy metal in the sample.

Other aspects, features, and advantages other than those described above will become apparent from the following detailed description, claims and drawings for carrying out the disclosure.

MODE OF DISCLOSURE

Hereinafter, various embodiments of the present disclosure are described in relation to the attached drawings. As the disclosure allows for various changes and numerous embodiments, particular embodiments will be illustrated in the drawings and described in detail in the written description. However, this is not intended to limit the present disclosure to particular modes of practice, and it is to be appreciated that all changes, equivalents, and substitutes that do not depart from the spirit and technical scope are encompassed in the present disclosure. Like reference numerals in the drawings denote like elements.

In various embodiments of the present disclosure, it is to be understood that expressions such as "including" and "comprising" indicate the existence of the functions, actions, or components and are not intended to limit one or more other functions, actions, or components. Also, in the present specification, it is to be understood that the terms such as "including," "having," and "comprising" are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

In various embodiments of the present disclosure, the term "or" includes any or all combinations of words listed together. For example, "A or B" may include either A or B or both A and B.

In various embodiments of the present disclosure, the terms "first," "second," or the like may modify various components in the embodiments, but such components are not limited by the above terms. For example, such expressions do not limit the order and/or importance of the components. The above terms are used only to distinguish one component from another. For example, both a first user device and a second user device are user devices and indicate different user devices. For example, without departing from the scope of the disclosure, a first component may be referred to as a second component, and similarly, the second component may be referred to as the first component.

It is understood that when a component is referred to as being "coupled" or "connected" to another component, it should be understood that the component can be directly connected or coupled to the other component, or intervening components may exist therebetween. On the other hand, when a component is referred to as being "directly coupled" or "directly connected" to another component, it should be understood that no other components are present between the component and the other component.

The terms used in one or more embodiments of the present disclosure are merely used to describe a certain embodiment, and are not intended to limit the embodiments of the disclosure. An expression used in the singular encompasses the expression of the plural, unless it has a clearly different meaning in the context.

Unless otherwise defined, all terms (including technical and scientific terms) used herein have the same meaning as commonly understood by one of ordinary skill in the art to which this disclosure belongs.

It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
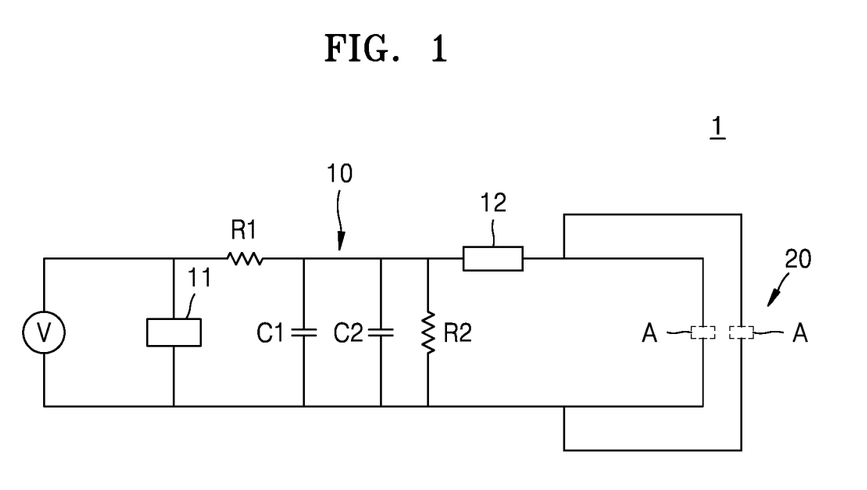
FIG. 1 is a circuit diagram schematically illustrating a device for detecting a concentration of a sample, according to an embodiment.
Figure 2:
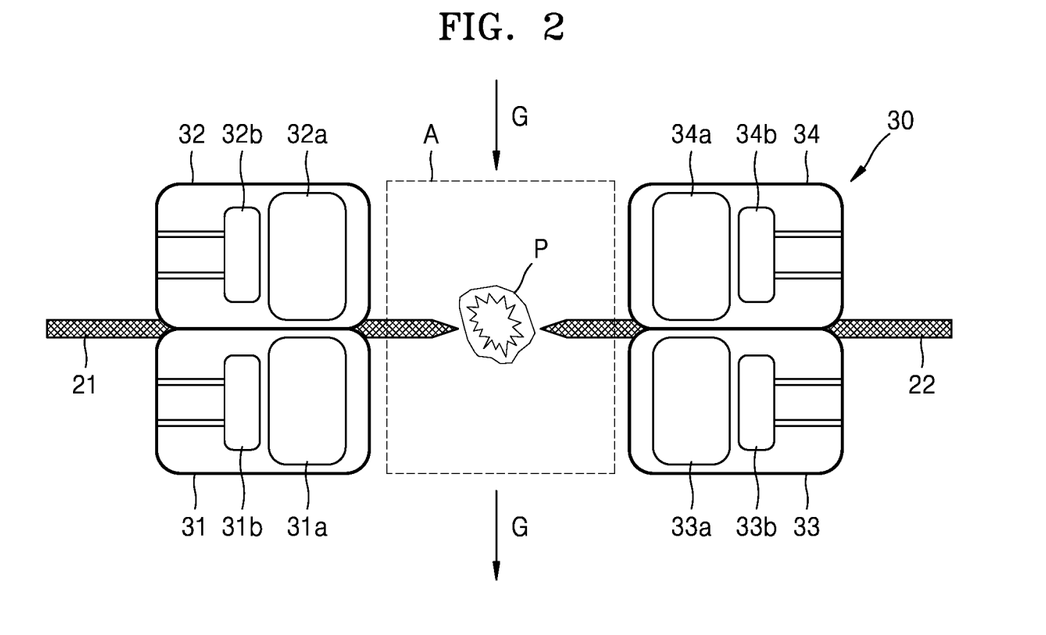
FIG. 2 is a diagram illustrating an enlarged region A of FIG. 1.
Figure 3:
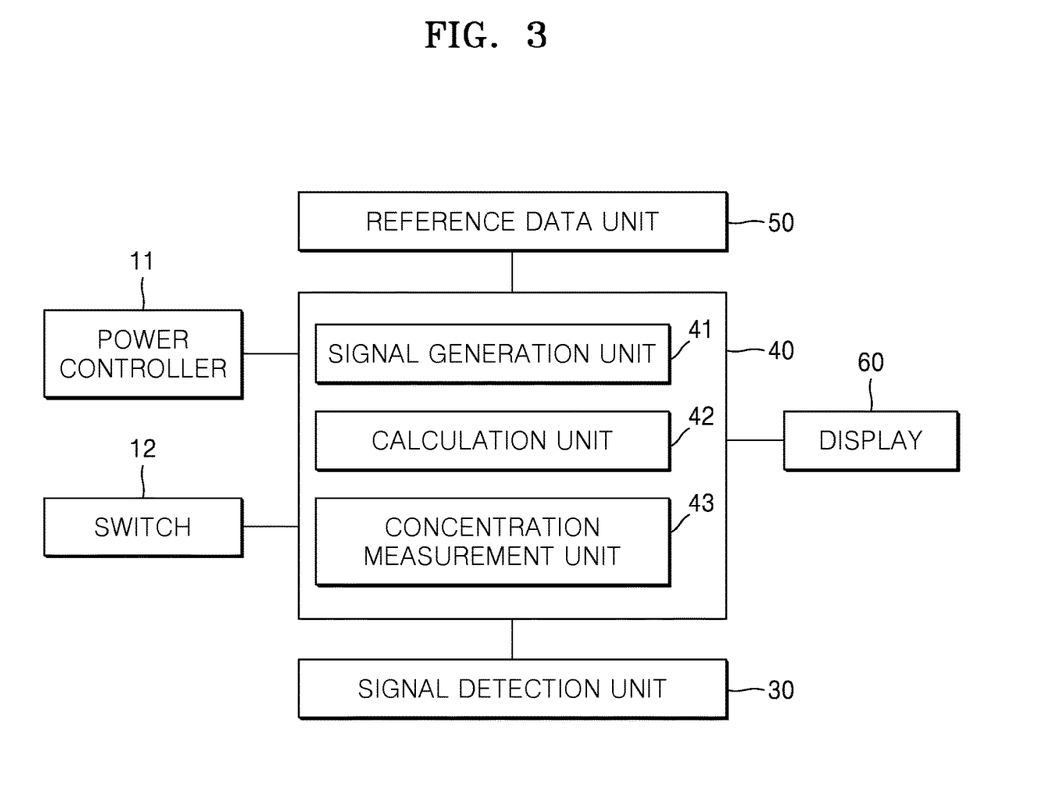
FIG. 3 is a block diagram of a controller of the device of FIG. 1 for detecting a concentration of a sample.

FIG. 1 is a circuit diagram schematically illustrating a device 1 for detecting a concentration of a sample, according to an embodiment. FIG. 2 is a diagram illustrating an enlarged region A of FIG. 1. FIG. 3 is a block diagram of a controller 40 of the device 1 of FIG. 1 for detecting a concentration of a sample.

Referring to FIGS. 1 to 3, the device 1 may include a power supply unit 10, a plasma generation unit 20, a signal detection unit 30, the controller 40, a reference data unit 50, and a display 60.

Samples may be of various types, and may be variously applied in science investigation, aerospace, chemistry, and a medical field. For example, a sample may be a space rock, and a device for detecting a concentration may detect a concentration of atoms or molecules included in the space rock. Also, the sample may be a tissue cell of a living body, and the device for detecting a concentration may measure blood sugar, electrolytes, or microelements and thus diagnose patients based on the measurement. Also, the sample may be an exhaust gas, and the device for detecting a concentration may measure traffic fumes and aircraft exhaust gases. The sample may also be a nuclear reactor material or an explosive including high-energy materials, and a device for detecting a concentration may detect concentrations of atoms or molecules included in the nuclear reactor material or the explosive. Hereinafter, however, the sample includes air including pollutants, in particular, air including heavy metals, and the device for detecting a concentration may be a device for measuring a concentration of heavy metals included in the air.

The device 1 for detecting a concentration of a sample changes a sample into plasma in an ionized state, electrically analyzes light, which is emitted when the plasma drops to a ground state after a certain period of time, and measures a concentration of atoms or molecules included in the sample.

The power supply unit 10 may supply power to generate the plasma. The power supply unit 10 may include a voltage V, capacitors C1 and C2, resistors R1 and R2, a power controller 11, and a switch 12.

The power supply unit 10 charges a current provided from the voltage V in the capacitors C1 and C2. The resistors C1 and C2 may adjust a current or a charging voltage of the power supply unit 10. The number or capacity of capacitors C1 and C2 and resistors R1 and R2 and the voltage V is not limited to a certain number and may vary according to a design of the device 1.

The power controller 11 may control whether the capacitors C1 and C2 are charged or discharged. For example, the power controller 11 may be an MCU controller. For example, the power controller 11 may control a current to make the capacitors C1 and C2 be charged. Also, the power controller 11 may enable plasma P to be generated by the plasma generation unit 20 as the capacitors C1 and C2 are discharged.

The switch 12 may control a current flowing to the signal detection unit 30. After the discharging is terminated in the plasma generation unit 20, the switch 12 may be used to control a driving time so that the signal detection unit 30 may function. That is, the switch 12 may adjust the driving time of the signal detection unit 30.

The plasma generation unit 20 may be connected to the power supply unit, and a pair of electrodes of the plasma generation unit 20 may be arranged to face each other. A first electrode 21 and a second electrode 22 of the plasma generation unit 20 have different polarities and are apart from each other with a certain space therebetween. Air that is a sample may pass through a space A between the pair of electrodes, and thus, the plasma may be generated.

A gas G may flow to the plasma generation unit 20. The gas G including heavy metals flows between the first electrode 21 and the second electrode 22, and when a capacitor is discharged, the gas G may become ionized because of the plasma. Especially, the heavy metals included in the gas may be ionized, and when the discharging of the capacitor is terminated, the heavy metals are stabilized in a ground state, and light is emitted.

The plasma generation unit 20 may be provided in plural. Referring to FIG. 1, the plasma generation units 20 may be connected in parallel and arranged at different locations. Because the plasma generation units 20 are spatially arranged at different locations, a centration of heavy metals may be measured in each space.

The signal detection unit 30 may be adjacent to the plasma generation unit 20. The signal detection unit 30 may be adjacent to the first electrode 21 and the second electrode 22 and may sense the sample and the emitted light because of the plasma. When the heavy metals are stabilized from the ionized state to the ground state, the signal detection unit 30 may sense the emitted light and measure the same as an electrical signal.

The signal detection unit 30 may include a sensor or sensors. The number of sensors is not limited to a certain number and may be set according to types of heavy metals for measurement. However, for convenience of explanation, an example in which the number of sensors is four will be mainly described. Also, each sensor may include a filter for filtering light in a preset wavelength band, and a photodiode for converting a signal from the filter into an electrical signal.

A first sensor 31 may detect chromium (Cr) and include a first filter 31a and a first photodiode 31b. The first sensor 31 may measure the amount of light emitted in a wavelength band of Cr and may convert the light into an electrical signal based on the measured amount of light. The first filter 31a may allow the light from the sample to pass the wavelength band of Cr, and the first photodiode 31b may convert the light passing through the first filter 31a into an electrical signal.

A second sensor 32 detects lead (Pb) and includes a second filter 32a and a second photodiode 32b. The second sensor 32 may measure the amount of light emitted in a wavelength band of Pb and may convert the light into an electrical signal based on the measured amount of light. The second filter 32a may allow the light from the sample to pass the wavelength band of Pb, and the second photodiode 32b may convert the light passing through the second filter 32a into an electrical signal.

A third sensor 33 detects copper (Cu) and includes a third filter 33a and a third photodiode 33b. The third sensor 33 may measure the amount of light emitted in a wavelength band of Cu and may convert the light into an electrical signal based on the measured amount of light. The third filter 33a may allow the light from the sample to pass the wavelength band of Cu, and the third photodiode 33b may convert the light passing through the third filter 33a into an electrical signal.

A fourth sensor 34 detects zirconium (Zr) and includes a fourth filter 34a and a fourth photodiode 34b. The fourth sensor 34 may measure the amount of light emitted in a wavelength band of Zr and may convert the light into an electrical signal based on the measured amount of light. The fourth filter 34a may allow the light from the sample to pass the wavelength band of Zr, and the fourth photodiode 34b may convert the light passing through the fourth filter 34a into an electrical signal.

The sensors of the signal detection unit 30 may have different wavelength bands, respectively. Because the first filter 31a to the fourth filter 34a have different wavelength bands, the first filter 31a to the fourth filter 34a may sense light emitted from certain heavy metals.

Depending on the types of heavy metals, times taken for the heavy metals to be ionized in the plasma and return to the ground state are different. For example, Pb is stabilized to the ground state after one microsecond (μs) after the plasma is generated, and Cr is stabilized to the ground state after 1.2 μs. A time taken for each heavy metal to be stabilized in the ground state is associated with a unique characteristic thereof. Therefore, for accurate measurement of the concentration of heavy metals, it is necessary to detect light from each sensor after a certain delay time.

The signal detection unit 30 is provided in plural, and the signal detection units 30 are driven in different delay times. After the capacitors C1 and C2 stop being discharged, the signal detection units 30 are driven in different delay times, respectively. The signal detection units 30 may be driven in different delay times according to unique characteristics of the heavy metals and may accurately measure the amount of light emitted from each heavy metal, thereby accurately measuring the concentration of the heavy metals included in the air. Therefore, the first sensor 31 to the fourth sensor 34 may have different driving start points in time.

Figure 4:
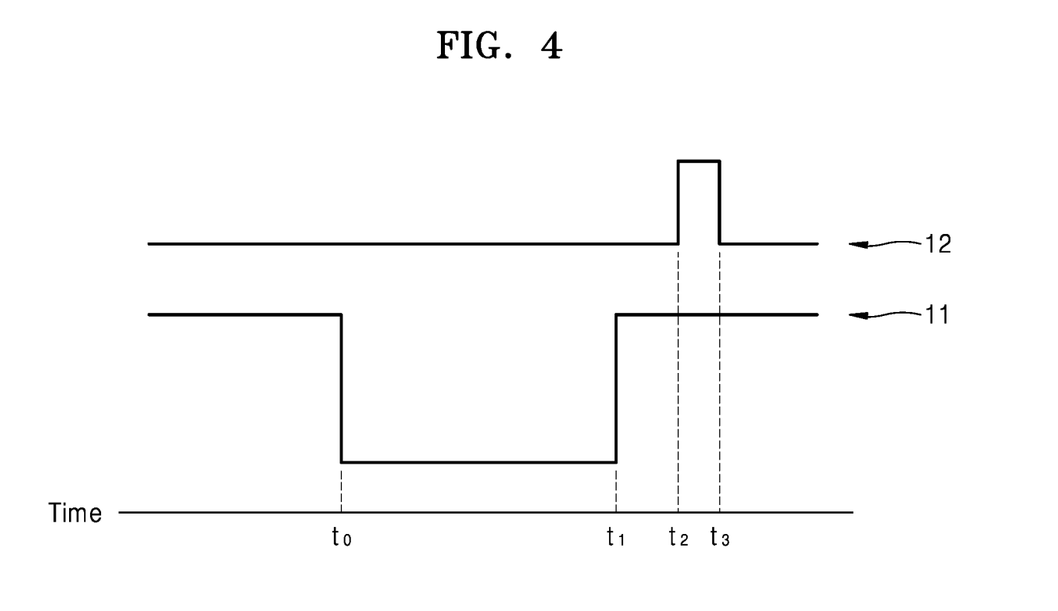
FIG. 4 is a graph showing a control relationship of the controller of FIG. 4.

FIG. 4 is a graph showing a control relationship of the controller 40 of FIG. 4.

Referring to FIGS. 3 and 4, the controller 40 may be connected to the power supply unit 10, the signal detection unit 30, a reference data unit 50, and the display 60 and may control each of the listed components.

The controller 40 may be connected to the power controller 11 and may control the charging and discharging of the capacitors C1 and C2. Also, the controller 40 may be connected to the switch 12 and control the driving of the signal detection unit 30. The switch 12 may be used to control a current flowing to the signal detection unit 30 to control the driving thereof.

After the oscillation is terminated between electrodes, the controller 40 may generate a trigger signal to make the signal detection unit 30 be driven after a preset period of time. The signal generation unit 41 may generate trigger signals having different delay times, according to characteristics of heavy metals that are respectively measured by the sensors. In response to the trigger signals generated by the signal generation unit 41, the signal detection units 30 may be driven in different delay times.

Referring to FIG. 4, the power controller 11 discharges the capacitor so that the electrodes are oscillated for the plasma generation in a point in time t0. The gas G is changed to a plasma state as the discharging of the capacitor continues until a point in time t1, and the heavy metals included in the gas G are ionized.

When the oscillation is terminated between the point in time t1, the ionized heavy metals return to the ground state and emit light. However, as described above, it takes some time for the heavy metals to return to the ground state from the ionized state, according to unique properties of respective metals. Referring to FIG. 4, a period of time from t1 to t2 indicates a time taken for the metals to return to the ground state from the ionized state, and such a time differs according to metal types.

When the amount of light emitted when the metals return to the ground state is detected, the concentration of the heavy metals may be accurately measured. In a point in time t2, the controller 40 may generate a trigger signal to make the switch 12 be driven. That is, the signal generation unit 41 of the controller 40 may adjust a delay time (the period of time from t1 to t2) and may be driven in a different period of time in each sensor, according to the trigger signal. Therefore, the period of time from t1 to t2 may differ according to the metals measured.

When the trigger signal is transmitted to the switch 12, the signal detection unit 30 is driven and measures emitted light. Each filter of the signal detection unit 30 may filter light in a wavelength band corresponding to a characteristic of each metal, and each photodiode of the signal detection unit 30 may convert the amount or intensity of light into an electrical signal.

The controller 40 may integrate the signal from the signal detection unit 30 for a certain period of time and may predict the concentration of the heavy metals included in the sample by comparing an integration value with reference data.

In detail, based on data transmitted from the signal detection unit 30, a calculation unit 42 of the controller 40 may transform the data to predict the concentration of the heavy metals. The calculation unit 42 of the controller 40 may calculate an integration value of an electrical signal in a period of time from t2 and t3 when the signal detection unit 30 is driven.

Figure 5A:
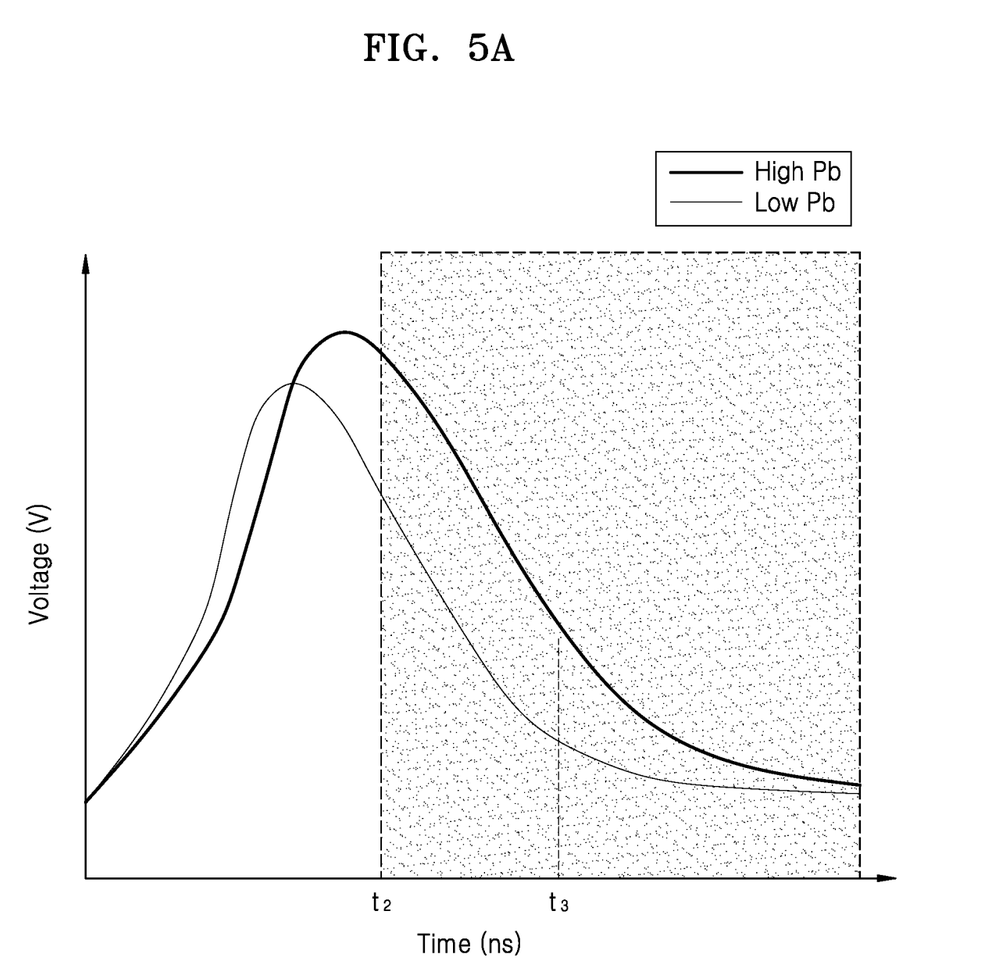
FIG. 5A is a graph showing an electrical signal detected by a signal detection unit.
Figure 5B:
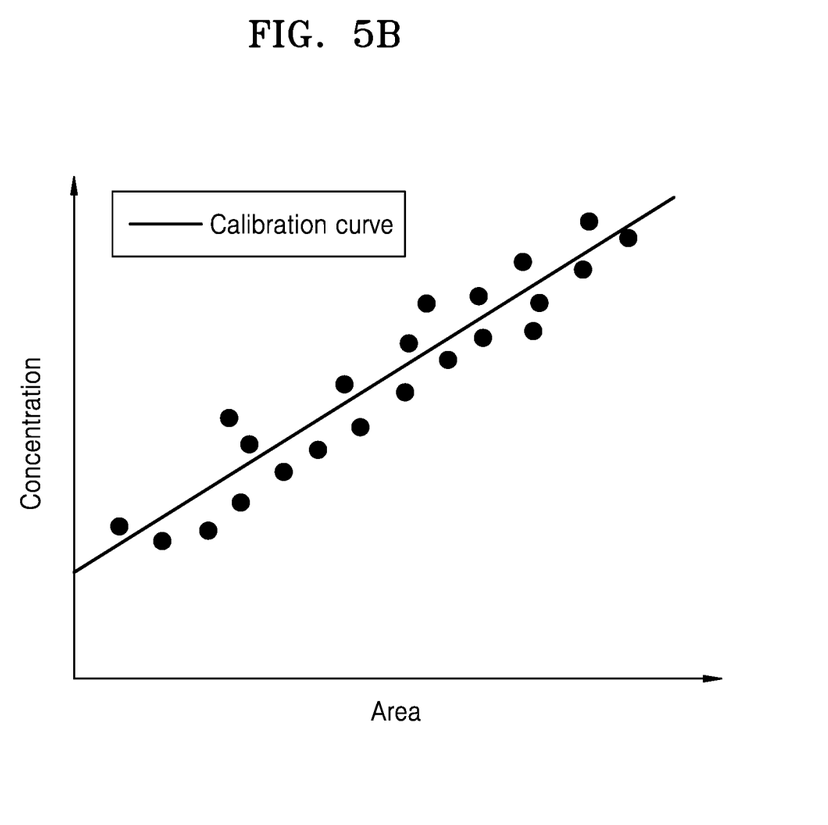
FIG. 5B is a graph showing a concentration detected by integrating the graph of FIG. 5A.

Referring to FIG. 5A, a size of the electrical signal detected by the signal detection unit 30 may be indicated as a voltage. The integration value of the electrical signal may be used as data for predicting the concentration of the heavy metals. As shown in FIG. 5B, as an integrated area increases, the concentration increases. Therefore, the integration value in the period of time from t2 to t3 may be calculated and may be compared with the reference data. Thus, the concentration of the heavy metals may be predicted.

In an embodiment, the period of time between t2 and t3 may be identical for each sensor. The signal detection unit 30 includes sensors having different delay times (t1 to t2), but a time taken for each sensor to measure the light is identical as the period of time from t2 to t3. For example, the period of time from t2 and t3 may be 1 μs. Therefore, the light, which is emitted from each heavy metal from the ionized state to the ground state, is measured by the signal detection unit 30 for identical periods of time. By comparing the amounts of light measured during the identical periods of time, the amount of heavy metals included in the air may be compared.

FIG. 5A is a graph showing an electrical signal detected by the signal detection unit 30, and FIG. 5B is a graph showing a concentration calculated by integrating the graph of FIG. 5A.

Referring to FIGS. 5A and 5B, the controller 40 may predict the concentration of the heavy metals by comparing the integration value calculated by the calculation unit 42 with the reference data of the reference data unit 50.

The reference data unit 50 may store reference data associated with an integration value of an optical signal, according to the concentration of the heavy metals. Pieces of the reference data are stored in the reference data unit 50 in advance to measure the concentration of the heavy metals, before the device 1 operates.

Referring to FIG. 5A, the reference data includes a graph regarding a voltage according to a time when the heavy metals emit the light. Each piece of the reference data differs according to the concentration of the heavy metals. For example, according to the Pb concentration, the graphs are shown differently. Also, the pieces of reference data include different graphs varying according to the types of the heavy metals.

The graph of FIG. 5B is changed to a calibration function, based on the graph of FIG. 5A. For example, the concentration is displayed according to the integration value of the graph of FIG. 5A in the period of time from t2 to t3, and is predicted with a function to generate a calibration curve.

Because the reference data unit 50 has a calibration curve used to predict the concentration according to the integration value of each heavy metal, when the calculation unit 42 of the controller 40 calculates the integration value in the period of time from t2 to t3, a concentration prediction unit 43 may predict the concentration of each heavy metal through the graph of FIG. 5B.

The display 60 may be connected to the controller 40 and may display the concentration of the heavy metals that is interpreted by the concentration prediction unit 43. The amount of heavy metals included in the gas G may be identified by displaying the concentration of each heavy metal.

Figure 6:
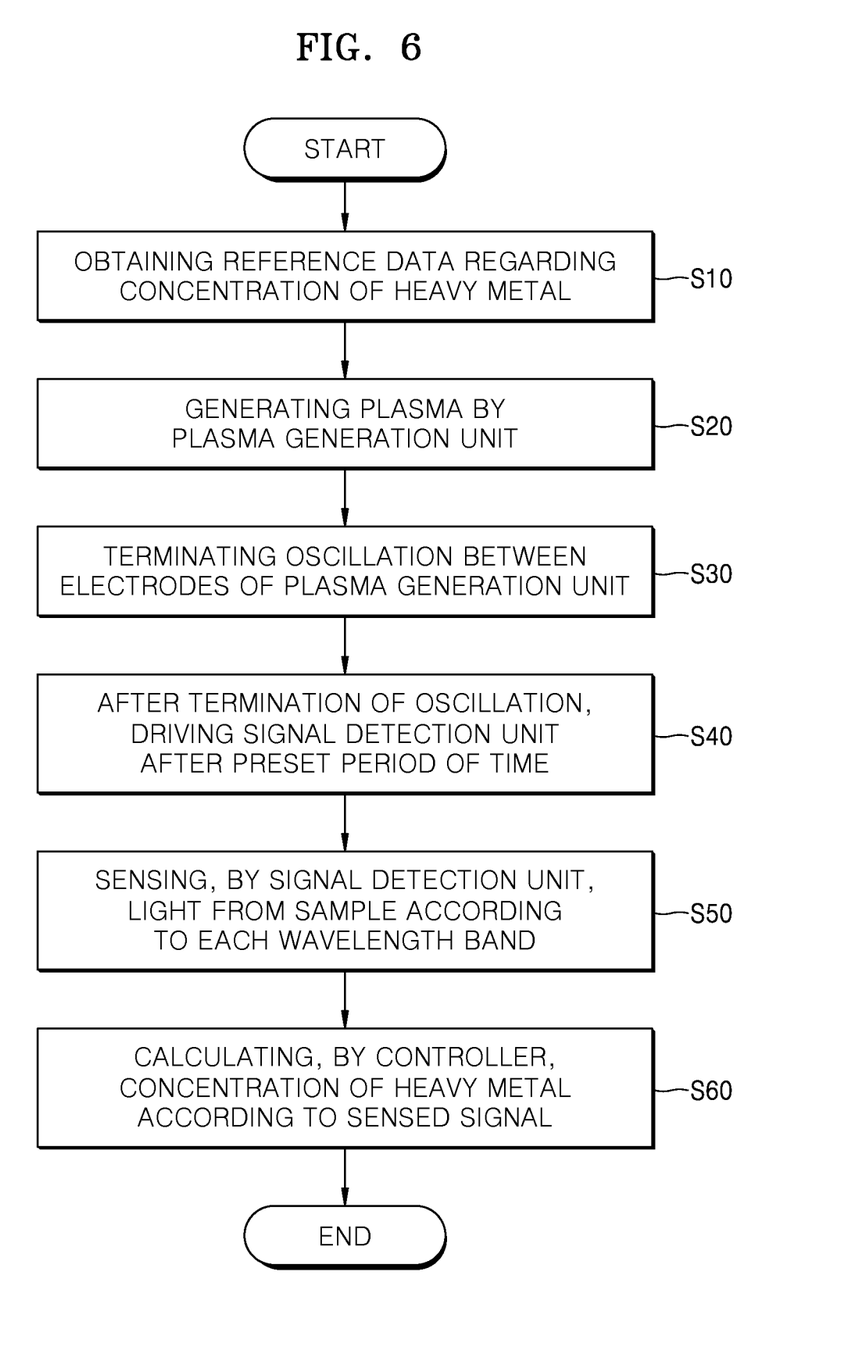
FIG. 6 is a flowchart of a method of detecting a concentration of a sample, according to another embodiment.

FIG. 6 is a flowchart of a method of detecting a concentration of a sample, according to another embodiment.

Referring to FIG. 6, the method of detecting a concentration of a sample may include: operation S10 in which reference data regarding the concentration of heavy metals is obtained; operation S20 in which plasma is generated by a plasma generation unit; operation S30 in which the oscillation is terminated between electrodes of the plasma generation unit; operation S40 in which a signal detection unit is driven after a preset period of time after the oscillation is terminated; operation S50 in which the signal detection unit senses light emitted from the sample in each wavelength band; and operation S60 in which a controller calculates the concentration of heavy metals according to a sensed signal.

Operation S10, in which the reference data regarding the concentration of the heavy metals is obtained, is an operation including the reference data for comparison before the concentration of the heavy metals included in the sample is measured. The reference data unit 50 may convert light emitted from each heavy metal into a voltage value that is an electrical signal as shown in FIG. 5A, and may store the reference data, which is the calibration curve regarding the concentration of the heavy metals, based on the integration value as shown in FIG. 5B. Also, each heavy metal may have the reference data.

In operation S20, in which the plasma generation unit generates the plasma, the plasma is generated in a space between a pair of electrodes of the plasma generation unit 20 that are connected to the power supply unit 10. When the capacitor is discharged, the plasma is generated in the space between the first electrode 21 and the second electrode 22 because of strong electrical sparks (t0). In this case, the heavy metals, which are included in the gas flowing in the space, are ionized.

In operation S30, in which the oscillation stops between electrodes of the plasma generation unit, the discharging is terminated on the capacitor (t1). When the plasma generation is terminated, the ionized heavy metals start being stabilized to the ground state.

After the oscillation is terminated, in operation S40, in which the signal detection unit is driven after a preset period of time, when the oscillation is terminated between the electrodes, the signal detection unit 30 is driven after the preset period of time (t2). Because times taken for the heavy metals to return to the ground states are different, the signal generation unit 41 of the controller 40 transmits a trigger signal to the switch 12 to make each heavy metal have a different delay time, and the signal detection unit 30 is driven according to each delay time.

In operation S50 in which the signal detection unit senses the light emitted from the sample in each wavelength band, the signal detection unit 30 senses the light from the sample in each wavelength band because of the plasma. Respective sensors of the signal detection unit 30 sense the light in different wavelength bands, according to types of the heavy metals. A filter filters the light in each wavelength band, and a photodiode converts the filtered amount of light into an electrical signal, that is, a voltage value.

In operation S60 in which the controller 40 calculates the concentration of the heavy metals according to a sensed signal, the voltage value in the period of time from t2 to t3 may be integrated, and an integrated area is compared with the reference data. Thus, the concentration may be predicted.

According to a device and a method of detecting a concentration of a sample according to the one or more embodiments, the concentration of heavy metals included in the sample may be accurately and quickly calculated by detecting a plasma emission spectrum. The amount of heavy metals in the air may be measured by detecting the amount of light emitted when the heavy metals are ionized and return to a ground state.

According to a device and a method of detecting a concentration of a sample according to the one or more embodiments, because signal detection units have different signal start points in time depending on types of the heavy metals, the amount of light emitted from the heavy metals may be accurately measured. Also, the amount of heavy metals may be accurately measured by filtering the light in respective wavelength bands according to the types of the heavy metals.

According to a device and a method of detecting a concentration of a sample according to the one or more embodiments, because an electrical spectrum is used without chemical preconditioning, the concentration of the heavy metals may be accurately calculated in real time.

While this disclosure has been particularly shown and described with reference to embodiments thereof, it will be understood by one of ordinary skill in the art that various changes in form and details may be made therein without departing from the spirit and scope of the disclosure as defined by the appended claims.

INDUSTRIAL APPLICABILITY

The present disclosure relates to a device and a method for detecting a concentration of a sample, which are used to accurately and quickly measure a concentration of heavy metals included in the sample.

The invention claimed is:

1. A device of detecting a concentration of a sample, the device comprising:
    a power supply unit configured to supply power to generate plasma;
    a plasma generation unit connected to the power supply unit and comprising a pair of electrodes facing each other;
    a plurality of signal detection units arranged on the electrodes and including one or more sensors configured to sense light emitted from the sample because of the plasma; and
    a controller configured to control a driving start point of the signal detection unit so that the signal detection unit is driven after a preset period of time after oscillation from the electrodes is terminated, and
    wherein the controller is configured to control the driving start point to enable the plurality of signal detection units are respectively driven in different delay times, and
    wherein the controller is configured to equally control each period of time for which the one or more sensors measure light.

2. The device of claim 1, wherein the plasma generation unit has a space between the electrodes and through which the sample passes.

3. The device of claim 1, wherein the signal detection unit comprises:
    a filter configured to filter light in a preset wavelength band; and
    a photodiode configured to electrically convert a signal from the filter.

4. The device of claim 1, wherein the controller is configured to integrate signals, which are transmitted from the plurality of signal detection units, into identical periods of time.

5. The device of claim 4, further comprising a reference data unit configured to store reference data comprising information regarding a concentration of a heavy metal,
   wherein the controller is configured to integrate the signals from the plurality of signal detection units into a preset period of time, compare integration values with the reference data, and predict the concentration of the heavy metal in the sample.

6. The device of claim 1, wherein the plurality of signal detection units sense light in different wavelength bands, respectively.

7. The device of claim 1, wherein the plasma generation unit is provided in plural, and the plurality of plasma generation units are connected in parallel and arranged at different locations.

8. A method of detecting a concentration of a sample, the method comprising:
   generating, by a plasma generation unit, plasma in a space between a pair of electrodes facing each other, the plasma generation unit being connected to a power supply unit;
   terminating oscillation from the pair of electrodes of the plasma generation unit;
   driving a signal detection unit after a preset period of time, after the oscillation from the pair of electrodes is terminated;
   sensing, by the signal detection unit, light emitted from the sample, according to a wavelength band; and
   calculating, by a controller, a concentration of a heavy metal in the sample, from a signal sensed by the signal detection unit, and
   in the driving the signal detection unit, the controller is configured to control the driving start point to enable the plurality of signal detection units are respectively driven in different delay times, and
   in the sensing by the signal detection unit, the controller is configured to equally control each period of time for which one or more sensors included in the plurality of signal detection units measure light.

9. The method of claim 8, wherein, in the sensing of the light by the signal detection unit, a plurality of filters and a plurality of photodiodes sense light in different wavelength bands, respectively.

10. The method of claim 8, further comprising obtaining reference data, which is information regarding the concentration of the heavy metal, before the sample is detected,
   wherein the calculating of the concentration of the heavy metal comprises integrating a signal from the signal detection unit for a preset period of time, comparing an integration value with the reference data, and predicting the concentration of the heavy metal in the sample.

* * * * *